Figure 1:
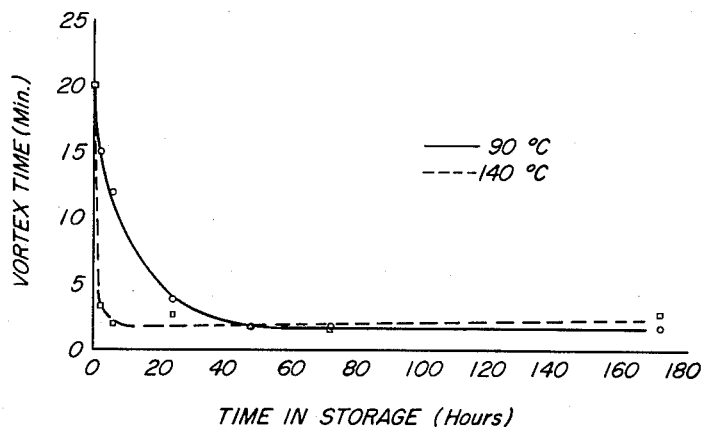

INVENTORS:
Richard E. Van Strien
Philip H. Towle
BY Everett A. Johnson
ATTORNEY

United States Patent Office 2,751,283
Patented June 19, 1956

2,751,283
RAPID GELLING BASIC ALUMINUM SOAPS

Richard E. Van Strien, Griffith, Ind., and Philip H. Towle, Chicago, Ill., assignors to Standard Oil Company, Chicago, Ill., a corporation of Indiana Application March 2, 1953, Serial No. 339,504

12 Claims. (Cl. 44—7)

This invention relates to improvements in the preparation and use of bodying agents for gelling normally liquid hydrocarbons and other organic liquids. More particularly, the invention pertains to improved method of preparing gelling agents useful in forming liquid hydrocarbons into gels.

More specifically, the invention is directed to the preparation and use of a bodying agent in preparing solidified or gelled hydrocarbon liquids useful as charges for incendiary bombs, grenades, flame throwers, land mines, and the like. The improved hydrocarbon gel composition may also be used as hydraulic fracturing media for producing channels in earth formations to increase the productivity of fluids from strata traversed by an oil or gas well as described, for example, in the Oil and Gas Journal, vol. 47, No. 24 (October 14, 1948), pages 76 et seq., and in U. S. Patents 2,596,843-4.

Extensive research and field tests have established a number of exacting requirements for military incendiary gels. They must be stable at temperatures over the range of from about −40° to +65° C. so that they may be used in any climate. Under storage conditions they must not break down with loss of viscosity. They must have sufficient cohesion to prevent premature dispersion. They must adhere to a target sufficiently long to set it on fire. They must be capable of easy ignition even at subzero temperatures. In addition, it is highly desirable that the gelling agent be capable of forming gels which meet these requirements with a wide variety of hydrocarbon fuels. Such gels should be formed rapidly when relatively small amounts of gelling agent are employed.

Our method for improving the gelation rate of basic aluminum soaps of mixed octanoic acids includes heating the dried soaps under controlled conditions in sealed containers. These containers may be those for final packaging of the soap. By this expedient the desirable characteristics of our basic aluminum soaps of mixed octanoic acids are extended to include a high gelation rate making the soap satisfactory for use in military continuous mixing devices. Thus, our soap when heat treated has high gelling power, produces stable gels, the gels are moisture insensitive, and the rate of gelling is very high.

Briefly, the preparation of our preferred gelling agent involves a series of reactions which include producing branched heptenes by reacting a hydrocarbon stream containing a mixture of propylene and butylenes over an acid-type catalyst; and fractionating the reaction product to produce essentially pure branched heptenes; reacting the branched heptenes with CO and $H_2$ in the presence of cobalt-containing catalyst to produce a mixture of isooctyl aldehydes, i. e., by the well known oxo process; hydrogenating the isooctyl aldehyde mixture to convert the isooctyl aldehydes to isooctyl alcohols; fractionating the isooctyl alcohols to remove therefrom substantially all components higher and lower boiling than isooctyl alcohols; converting the fractionated isooctyl alcohols to alkali metal salts of the corresponding acids by fusion with an alkali metal hydroxide; converting the alkaline solution of the resulting alkali metal isooctanoates to the corresponding basic soaps by reaction with an aqueous solution of an aluminum salt of an inorganic acid, preferably a solution of aluminum chloride hydrate; and finishing the precipitated soaps by a combination of drying and grinding steps.

The resulting basic aluminum soaps are mixtures of basic aluminum isooctanoate components, a plurality of which are each present in amounts greater than about 5 wt. percent. By the term "aluminum isooctanoates" we mean to define the material produced according to our invention from a mixture of isooctyl alcohols predominating in dimethyl hexanols and methyl heptanols. Each component may have the same or different isooctanoate radicals, the isooctanoate radicals having 5 to 7 carbon atoms in the straight chain structure; in other words, the mixture consists chiefly of methylheptanoates and dimethylhexanoates with little or no normal octanoate (caprylate) or 2-ethylhexanoate.

Our preferred method for preparing the basic aluminum soaps of mixed isooctanoic acids as outlined above is described in more detail in co-pending application S. N. 296,132, filed June 28, 1952, for "Gelling Hydrocarbon Liquids," now abandoned. Such method gives the soaps the property of producing stable and moisture insensitive gels but also tends to make the aluminum soaps slow gelling. In some applications, especially military, a slow gelling aluminum soap possessing otherwise desirable properties is often considered inadequate. Therefore, it becomes important to have a rapidly gelling soap.

In the preparation of gels from liquid hydrocarbons and basic aluminum soaps it is desirable from practical considerations of mixing to have the gelation take place rapidly. Although basic aluminum soaps have heretofore been prepared which form gels very rapidly in liquid hydrocarbons, these prior soaps and gels do not have the desirable properties of moisture insensitivity and moisture stability. We have found that we can impart these desirable properties of moisture insensitivity to our soap by a two-stage drying technique which involves an initial drying step usually carried out at temperatures below about 150° F. and a final drying of our soap at a higher temperature, generally at about 200–212° F. However, by so doing the time of gelation for these soaps is frequently increased to an extent which makes them less desirable for some purposes.

When our basic aluminum soaps are prepared in the preferred manner, i. e., by employing a two-stage drying process and a concomitant grinding step with the final drying at temperatures in the range of about 200–212° F., whereby the moisture content of the soap is reduced below about 1.5 wt. percent, we have found that the gelation rate is frequently undesirably slow. We have overcome this undesirably slow gelation rate by heating the soap under such conditions that all parts of the soap mass will have been at temperatures ranging from about 150° to about 300° F., preferably in the range of 190° to 285° F., for a period of time ranging from about 0.5 hour to about one week or more, preferably about two hours to about 24 hours, the longer times corresponding to the lower temperatures, while at the same time preventing any substantial addition to or withdrawal of the atmosphere with which the material is in contact. One method by which this may be accomplished is by introducing the material, preferably of a particle size suitable for gelation, e. g., about 95% passing through a U. S. standard screen No. 20, into a container such as a can or jar and essentially hermetically sealing before carrying out the heat treatment. Alternatively, this process may be carried out in a continuous or a semi-continuous manner. The soap is passed continuously or semi-continuously after drying, with concomitant grinding step, if desired, to a vessel and is maintained therein for the required time at the required temperature under conditions which would prevent the escape of a substantial amount of acid from the soap mass. The soap is passed continuously or semi-continuously from the vessel and is cooled. The treatment in the heat treating vessel and the cooling step should be carried out under conditions such that there would be no substantial change in the atmosphere with which the material is in contact.

The mechanism by which our invention increases the gelling rate of the aluminum type mixed soaps is not apparent. However, it is believed that free or combined fatty acid is concentrated at the surface of the soap particles during the heat treatment and it is desirable to prevent substantial escape of such acid from the heating zone or soap cooling zone. It is further believed that this acid which is concentrated at the surface acts as a solvating agent causing the aluminum soap to gel more rapidly. Three possible explanations may account for the mechanism whereby this occurs. One involves the migration of free acid within the soap particles to the outer surface of these particles. Moisture in the soaps may result in hydrolysis of a portion of the aluminum soaps to provide additional free acid. A third possibility involves re-orientation of the surface molecules, with the most oil-soluble hydrocarbon chain of the acid group being thereby concentrated at the surface of the particles. Although these theories are offered as possible explanations of the unexpected effect of the heat treatment on the soap, it should be understood that we do not intend to be limited by any of these theories. In any event, the beneficial effect of such heat treatment in an isolated system has been observed and we have been enabled to produce satisfactory gelling agents of greatly increased gelling rate.

In using the gelling agent for military purposes, produced according to the foregoing procedure, a common procedure is to add a quantity of the agent to a liquid hydrocarbon such as motor gasoline, kerosene, jet fuel, aviation gasoline, diesel oil, etc., either manually or by means of mechanical mixing devices, and to stir at ambient temperatures until the soap particles no longer settle readily from the hydrocarbon medium, whereupon the partially formed gel is transferred to the weapon in which it is to be used where it is allowed to cure to its final strength. Between about 0.5 and about 10 wt. percent, preferably between 1.5 and 4 wt. percent of our mixed aluminum octanoates produces the desired gel.

Gelation begins immediately when the agent and liquid are stirred at temperatures of between about 30° F. and 100° F., and the initial gelation is reached in about 10 to about 20 minutes depending on the concentration and somewhat on the degree of agitation. The rate is determined by a standard test described hereinafter which is in terms of the "vortex time," i. e., the time necessary to obtain a specific diminution in the amplitude of a vortex in a mass stirred under defined conditions. The "vortex time" is a measure of the rate at which a gelling agent causes a hydrocarbon solvent to thicken.

For general laboratory testing of gelling agents a quantity of the hydrocarbon solvent is introduced into a square-type pint Mason jar having dimensions approximately 3 inches by 3 inches by 5 inches deep. A total weight of 200 grams of solvent and gelling agent is employed. For example, if 4 wt. percent gel is to be prepared, 8 grams of the gelling agent will be added to 192 grams of the solvent.

A glass stirring rod is employed which is about ⅜ inch in diameter with 4 vanes, ⅞ by ⅞ by ⅛ inch, set at right angles and with faces parallel to the axis of the rod. The stirrer is mounted within the jar with the bottom of the stirrer ½ inch above the bottom of the jar. A reference mark is made on the glass rod 1.0 cm. below the surface of the test solvent.

The stirring speed is adjusted to 300±10 r. p. m. and the temperature of the solution is controlled at some standardized temperature. For example, 77° F. was frequently used in our work. The time elapsed between the addition of the gelling agent sample and the covering of the reference mark on the rod by the rising vortex is recorded as the "vortex time." With gels of 4 to 2% soap, a vortex time of about 10 to 20 minutes or less indicates for most purposes a satisfactory gelation rate. The gel continues to cure for from 6 hours to about one day without stirring after the initial gelation, as measured by the "vortex time," occurs.

The properties of the final gel are measured by the "Gardner load" which is a measure of viscosity and indicates the consistency of a cured gel. The "Gardner load" is determined in a Gardner Mobilometer, an apparatus described in "Physical and Chemical Examination of Paints, Varnishes, Lacquers and Colors," 10th edition (May 1946), by Henry A. Gardner and G. G. Sward, which is distributed by Henry A. Gardner Laboratory, Inc., Bethesda, Maryland. The test is ordinarily made at 24 or 48 hours after initial gelation has taken place and the values are in terms of grams per 100 seconds. In general, a Gardner load in the range of about 125 to 225 grams designates a desirable gel consistency for flame-thrower service whereas a load of about 350 to 650 grams indicates a suitable consistency for other military incendiary purposes.

The Mobilometer used in our tests consists essentially of a cylinder supported by a base plate, a plunger or piston, and a collar to support the plunger. The cylinder is 8.0 inches deep and 1.538 inches in diameter. The plunger consists of a disc 1.500 inches in diameter with four perforations 0.250 inch in diameter and a weight pan or holder supported by the upper end of a tube or rod which is fixed at its lower end to the disc. The weight of the moving system which includes the disc, the connecting rod or tube, and the weight support is 100 grams.

To make the test, the cylinder is filled to a depth of 20 cm. with the gel to be tested and is leveled by means of adjusting screws. The disc end of the plunger is then introduced into the cylinder with the connecting tube aligned by a collar. The time required for two marks, 10 cm. apart, on the stem of the plunger to pass through the collar is then recorded. The pair of marks are ordinarily located so that they pass through the collar of the bracket as the disc passes through the mid-portion of the cylinder. Thus, the plunger is in motion both at the beginning and at the end of the test interval. In reporting results, the "Gardner load" is determined by noting two successive loads in grams for more than and less than 100 seconds' travel. The load required to give a time of fall of 100 seconds is obtained by linear interpolation from the two readings.

The effect of high temperature storage on gelation rates of systems comprising basic aluminum soaps produced from mixed isooctanoic acids has been demonstrated by many tests and data are given in Table I below. Gelation rate tests were conducted at 77° F. using 4 wt. percent concentration of soap in standard test solvent which conforms to Military Standard M. S. 602 (October 22, 1951).

Different batches of soap were heat treated at 90° C. and 140° C. in sealed containers after which the vortex time and Gardner load were determined. It will be noted that at 90° C. the improvement in the vortex time was observed at about 24 hours and that continued treatment at 90° C. did not alter the properties substantially. In the case of treating at 140 C. the corresponding gelation rate increase was noted after storage for only about 2 hours and as in the case of the 90° C. treatment, the continued treating at the higher temperature level did not materially alter the gelation rate as indicated by vortex time. These data are illustrated graphically in Figure 1 which also shows that a lower treating temperature is approximately equivalent to the higher treating temperature if it is maintained for a longer period of time.

TABLE I

*Effect of high temperature storage on gelation rate of basic aluminum soap from mixed isooctanoic acids*

[4 wt. percent concentration of soap in standard test solvent at 77°F.]

| Storage Temp. | 90°C. | | 140°C. | |
| --- | --- | --- | --- | --- |
| Storage Time (hrs.) | Vortex Time [1] | Gardner Load [2] | Vortex Time [1] | Gardner Load [2] |
| 0 (Initial) | 20 | 545 | 20 | 545 |
| 2 | 15 | 530 | 3.3 | 580 |
| 6 | 12 | 560 | 2.1 | 600 |
| 24 | 3.9 | 600 | 2.7 | 540 |
| 48 | 1.8 | 640 | 2.0 | 600 |
| 72 | 1.9 | 540 | 1.5 | 540 |
| 168 | 1.9 | 550 | 2.9 | 500 |

[1] In minutes.
[2] Consistencies at 24 hrs. in gm./100 sec.

We have also determined that the soap treated according to our method retains its improved quality. A sample heated in a sealed container for one week at 90° C. and subsequently stored in the container at room temperatures for five weeks and then exposed to the atmosphere for 96 hours had the properties set forth in Table II. These data demonstrate that once the soap has been heat treated the beneficiary effects thereof continue even though stored at lower temperatures for considerable lengths of time and even after exposure to the atmosphere for as long as 96 hours.

TABLE II

*Effect of storage on heat-treated basic aluminum soap of mixed isooctanoic acids*

[4 wt. percent concentration of soap in standard test solvent at 77°F.]

| Treatment | Vortex Time (Minutes) | 24 Hr. Gardner Load (gm./100 sec.) |
| --- | --- | --- |
| Initial | 19.8 | 545 |
| 1 week at 90°C.+5 weeks at 25°C. | 1.7 | 580 |
| 1 week at 90°C.+5 weeks at 25°C., Exposed to atmosphere 96 hrs. | 1.6 | 580 |

It is not essential that the sealed container be either full of soap or void of air in order to obtain the benefits of our process. To demonstrate this fact a steel bomb was half filled with a sample of our soap and heated for three hours at 140° C. In Table III the comparative data are presented and it will be noted that the gelling rate was increased but that the final gels, as measured by the Gardner test, were substantially unchanged.

TABLE III

*Effect of presence of air during heat treating*

[4 wt. percent concentration of soap in standard test solvent at 77° F.]

| Treatment | Vortex Time (Minutes) | 24 Hr. Gardner Load (gm./100 sec.) |
| --- | --- | --- |
| Initial | 17.5 | 620 |
| 3 hr. storage at 140° C | 3.2 | 630 |

The improvement in the gelation rate of basic aluminum octanoates is characteristic of mixtures. Results obtained after heating soaps prepared from a single isomeric octanoic acid such as 2-ethylhexanoic acid or caprylic acid indicate negative response to our heat treatment. Thus, basic aluminum 2-ethylhexanoate ("Octal") which had a vortex time of 30 minutes at 4 wt. percent concentration in standard test solvent at 77° F. had a vortex time of 90 minutes under similar conditions after heating in a sealed container at 90° C. for 2 hours. After heating for 24 hours at 90° C. the vortex time was greater than 180 minutes, i.e., the soap would not gel standard test solvent in over 3 hours. Similarly, basic aluminum caprylate, which had a vortex time of 54 minutes at 2 wt. percent concentration in standard test solvent at 77° F., would not gel standard test solvent in over 150 minutes after heating in a sealed container for 24 hours at 90° C. On the other hand, our treating process, which has been found advantageous for use on the mixed aluminum isooctanoates described above may be applied with benefit to soaps from simple binary mixtures of octanoic acid isomers which individually are unsatisfactory, such as a mixture of caprylic and 2-ethylhexanoic acids. Such a mixture, which had a vortex time at 4 wt. percent concentration of soap in standard test solvent at 77° F., of 12 minutes, had vortex times of 6.3 and 6.6 minutes when stored at 90° C. for 24 and 192 hours, respectively. The Gardner load values were not significantly affected. The data on these comparisons of individual isomers and simple mixtures are set forth in the following Table IV.

TABLE IV

*Effect of high temperature storage on gelation rate of basic aluminum soaps prepared from individual octanoic acid isomers and from a simple binary mixture of isomers*

[Soap in standard test solvent at 77° F.]

4 PERCENT BASIC ALUMINUM 2-EHTYLHEXANOATE [1]

| Storage Temp. | Storage Time (hrs.) | Vortex Time, Minutes | Gardner Load g./100 sec. |
| --- | --- | --- | --- |
| 90° C | 0 | 30 | 500. |
| 90° C | 2 | 90 | 465. |
| 90° C | 24 | >180 | Did not gel. |

2 PERCENT BASIC ALUMINUM CAPRYLATE [2]

| | | | |
| --- | --- | --- | --- |
| 90° C | 0 | 54 | <40. |
| 90° C | 24 | >150 | Did not gel. |

4 PERCENT BASIC ALUMINUM BINARY MIXTURE (1:1 CAPRYLATE AND 2-ETHYLHEXANOATE) [3]

| | | | |
| --- | --- | --- | --- |
| 90° C | 0 | 12 | 465. |
| 90° C | 24 | 6.3 | 490. |
| 90° C | 192 | 6.6 | 450. |

[1] Wt. percent moisture was 0.4.
[2] Wt. percent moisture was 0.4.
[3] Wt. percent moisture was 0.6.

Figure 2:
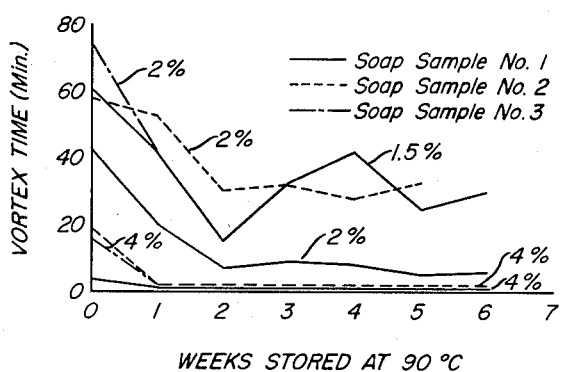

As shown in Figure 2 our improved gelling rate is obtained by the heat treatment of masses of soap separately prepared and separately heat treated according to the method of our invention. In Figure 2 three samples were prepared and were treated according to our invention and in each case the improvement in gelling rate was obtained as indicated by the decrease in the vortex time.

Figure 3:
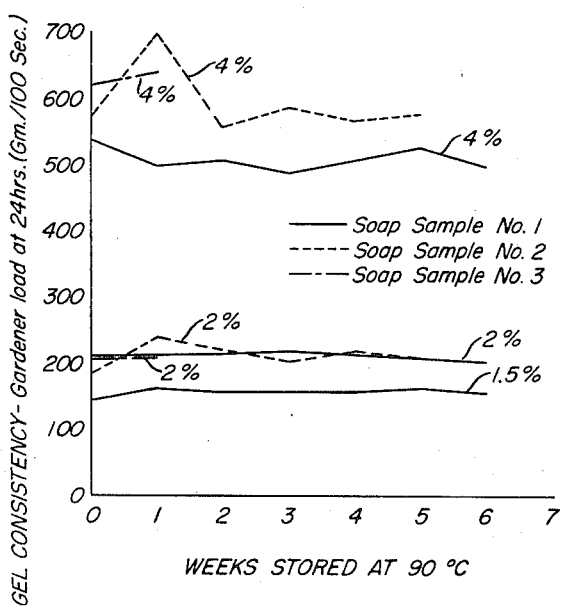

Our treatment of the finished soap does not adversely affect the other desirable characteristics of the gelling agents and in Figure 3 we have data from which it can be seen that the 24 hour consistencies of the gels are essentially constant for given soap concentrations regardless of the length of time for which the soaps have been heated in the sealed containers.

In Table V below we have additional data from which it is apparent that the heat-treated soap also retains its desirable resistance to the effects of atmospheric moisture. Exposure of the treated basic aluminum isooctanoate to conditions of 80% relative humidity at 80° F. has not brought about any loss in the consistency of the resulting gel.

TABLE V

*Effect of conditions of high relative humidity on the performance of basic aluminum soap prepared from mixed isooctanoic acids*

[4 wt. percent concentration of soap in standard test solvent at 77° F.]

| Storage Temp | 90° C. | | | |
|---|---|---|---|---|
| Exposure (80% RH at 80° F.) | 0 hr.[1] | | ¼ hr.[2] | |
| Storage Time (hrs.) | Vortex Time, Minutes | Gardner Load, g./100 sec. | Vortex Time, Minutes | Gardner Load, g./100 sec. |
| 0 | 5.6 | 440 | 3.3 | 460 |
| 168 | 1.2 | 500 | 1.7 | 475 |
| 336 | 1.9 | 470 | 1.3 | 480 |

[1] Moisture content of soap was 0.9 wt. percent.
[2] Estimated moisture content of soap was 1.5 wt. percent. While this value was not determined, based on numerous similar experiments, we believe this to be within ±0.2 wt. percent of the measurable quantity.

From the data and description presented herein it will be apparent that we have attained the objects of our invention and have provided a system for increasing the hydrocarbon liquid gelling rate of a novel gelling agent capable of producing gels with diverse normally liquid hydrocarbons.

Mixed octanoate aluminum soaps prepared without the benefit of our invention do not possess desirable all-around performance. For example, soaps when dried only to a moisture content of above about 1.5 wt. percent do gel very rapidly but do not give gels of high strength and are sensitive to atmospheric moisture. On the other hand, soaps prepared by our preferred method without the heat treatment give high gel strengths and are insensitive to atmospheric moisture but are slow gelling. However, treating this latter soap by our complete technique produces a soap which is rapid gelling, gives strong gels, and in addition retains moisture insensitivity.

By our process a simple and economical means is provided for upgrading basic aluminum soaps of mixed octanoic acids which soaps may initially be of only marginal value due to a slow rate of gelation. The rate of improvement in the gelation rate is a function of the heating temperature and of the length of the treatment which can be adjusted to the temperature of the product following the soap drying step. Thus, the benefits can be obtained whether the heated storage step is integrated with the manufacturing procedures either continuously or semi-continuously either in large sealed vessels or in small shipping units or it may be carried out at a later stage as, for example, after a period of storage.

As described above, we prefer to use temperatures in the heat treating ranging from about 150° to about 300° F. and we contemplate preferably the range of from about 190° to about 285° F. At temperatures below about 150° F. the benefits, if any, are not practicable since it would require an inordinately long time for the heat treating. On the other hand, if temperatures above about 300° F. are employed there may occur chemical or physical degradation of the soap particles.

Although we have described our invention in terms of specific examples which are set forth in considerable detail, it should be understood that these are by way of illustration only and that the invention is not limited thereto. Alternative embodiments and operation techniques will become apparent to those skilled in the art in view of our disclosure. Accordingly, modifications of our invention are contemplated without departing from the spirit of the described invention or the scope of the appended claims.

What we claim is:

1. In the preparation of basic aluminum isooctanoate soap for use as a gelling agent for liquid hydrocarbons the improvement which comprises reducing the moisture content of the soap to below about 1.5 wt. percent, heat treating the soap while contained in a sealed vessel for about two hours at a temperature of about 285° F., and preventing the transfer of gasiform fluids from said soap during the heat treating thereof whereby the gelling rate of the soap is increased.

2. The method of preparing a gelling agent from basic aluminum isooctanoate soaps which comprises the steps of drying the soaps to a moisture content of less than about 1.5 wt. percent, confining the soap of reduced moisture content within a sealed container, and maintaining the said sealed container at a temperature within the range of from about 150° F. to about 300° F. for at least 0.5 hour during which the concomitant gases are retained with the soap.

3. The method of increasing the gelling rate of basic aluminum isooctanoates for use in gelling liquid hydrocarbons which comprises the steps of hermetically sealing a mass of pre-dried soap and maintaining said sealed mass at an elevated temperature in the range of about 150° to about 300° F. for a time of at least one-half hour.

4. In the preparation of basic aluminum isooctanoate soaps the improvement which comprises reducing the moisture content of the soap to below about 1.5 wt. percent, confining the soap of reduced moisture content within a sealed container, and heat treating the confined soap for about two hours at a temperature of about 285° F.

5. The method of increasing the gelling rate of basic aluminum mixed octanoate soap consisting essentially of basic aluminum soaps of octanoic acid isomers for use in gelling liquid hydrocarbons which comprises the steps of reducing the moisture content of such soap below about 1.5 wt. per cent and subsequently maintaining said soap in a sealed vessel at an elevated temperature of between about 150° and 300° F. for a time of at least one-half hour.

6. The method for increasing the gelling rate of basic aluminum isooctanoates for use in gelling liquid hydrocarbons which comprises the steps of vapor-sealing a mass of pre-dried soap containing less than about 1.5 wt. per cent moisture and maintaining said sealed mass at an elevated temperature in the range of between about 150° and 300° F. for a time of at least one-half hour.

7. The method of claim 6 wherein the elevated temperature is about 285° F. and is maintained for a period of two hours.

8. A hydrocarbon liquid gelling agent consisting essentially of a mixture of basic aluminum octanoate soaps of octanoic acid isomers prepared by the steps of reducing the moisture content of the mixed soaps below about 1.5 wt. per cent, and heat treating the said mixture within a sealed container at an elevated temperature in the range of between about 190° and 285° F. for at least one-half hour whereby the gelling rate of the gelling agent is substantially increased.

9. A gelling agent for liquid hydrocarbons consisting essentially of basic aluminum octanoate soaps of mixed octanoic acid isomers characterized by having a high gelling rate in liquid hydrocarbons and produced by the steps which include confining in a sealed vessel a mass of finely divided soap having a moisture content of less than about 1.5 wt. per cent, and treating the confined mass of mixed soaps at an elevated temperature of at least 150° F. for a substantial period of time of at least one-half hour.

10. The method of producing a gelling agent consisting essentially of basic aluminum soap which is characterized by having been produced from a mixture of isomeric octanoic acids, at least one of which has a branched chain, the aluminum soap derived from said mixture of octanoic acids having been predried to a moisture content less than about 1.5 percent, the method which includes the steps of confining a finely divided mass of the predried mixed aluminum octanoate soap within a sealed vessel and heating said mass of confined soap at a temperature within the range of from about 150° F. to about 300° F. for a period of from about 2 hours to about 24 hours while maintaining the atmosphere in said vessel substantially unchanged during said heating step.

11. A gelled hydrocarbon liquid prepared by adding a heat-treated basic aluminum isooctanoate soap in an amount within the range of from about 0.5 to about 10 percent by weight to a liquid hydrocarbon with agitation, said heat-treated soap having been prepared by predrying said soap to a moisture content of less than about 1.5 percent and thereafter confining a mass of such soap within a sealed container and heating the confined soap to a temperature above about 150° F. for at least one-half hour.

12. A gelled hydrocarbon liquid prepared by adding to a liquid hydrocarbon from about 0.5% to about 10% by weight of a basic aluminum soap of a mixture of isomeric octanoic acids at least one of which acids has a branched chain said basic aluminum soap having been predried to a moisture content less than about 1.5 percent and then heat treated by the method of claim 10.

References Cited in the file of this patent

UNITED STATES PATENTS

| | | |
|---|---|---|
| 2,267,148 | Boner | Dec. 23, 1941 |
| 2,390,609 | Minich | Dec. 11, 1945 |
| 2,417,071 | Gebhart et al. | Mar. 11, 1947 |
| 2,618,536 | Hunn | Nov. 18, 1952 |
| 2,620,345 | Dean | Dec. 2, 1952 |